_United States Patent Office_

3,461,891
Patented Aug. 19, 1969

3,461,891
RAIN COVER FOR HATCHWAYS AND THE LIKE
Gote Einar Erling Blomberg, Vastergatan 3A,
Goteborg C, Sweden
Filed Apr. 10, 1967, Ser. No. 629,523
Claims priority, application Sweden, Apr. 13, 1966,
5,001/66
Int. Cl. B63b 27/00, 19/00
U.S. Cl. 135—6                                 5 Claims

ABSTRACT OF THE DISCLOSURE

The present rain covers are for protecting a loading area such as a ship's hatchway, railroad cars, or the like. The rain cover has a frame with an elongated yoke which is positioned substantially hoizontal during the use of the rain cover and an awning supported by said frame provided at its upper side with an elongated opening which is open at one end for the insertion therein of a load line, said yoke has legs defining said opening, rods yieldably connected to said yoke legs, a plurality of flaps distributed along said elongated opening, carried by said rods and displaceable under the influence of the load line by the yielding of said rods for permitting the load line to pass and as soon as the load line has passed a flap, said flap is returned to its initial position.

---

The present invention relates to rain covers for protecting a loading area, for instance a hatchway, and comprising an awning supported by a frame and further provided at the upper side with an elongated opening which is open at one end for the insertion therein of a load line.

Previously known rain covers of this general type have the drawback that the narrow opening for the insertion of the load line does not permit the load to be displaced by means of the hoisting device in a direction at right angles to the longitudinal direction of the opening. The load may thus only be deposited directly below the narrow opening in which the load line is insertable. Further, it is often difficult to guide the load line into the narrow opening.

The present invention has for its object to overcome this drawback by providing a device which permits positioning of the line carrying the load also transversely of the longitudinal direction of the opening without impairing the protection against rain and snow.

The invention is substantially characterised in that the frame comprises an elongated yoke which is substantially horizontal in the position of use of the rain cover, the legs of said yoke defining said opening and being so widely spaced from one another as to allow a load line inserted between said legs to be moved freely in all directions, said yoke legs carrying a number of rods which have one end yieldingly connected to said yoke legs and which extend towards the opposite yoke leg at an upwardly directed angle to adjacent a vertical middle plane between said yoke legs, said rods carrying number of flaps which are distributed along said elongated opening on each side of said middle plane and which are displaceable under the influence of the load line by yielding of said rods.

Further characteristics of the invention will be apparent from the following description and the appended claims.

The invention is described in greater detail herebelow with reference to the accompanying drawings, wherein.

Figure 1:
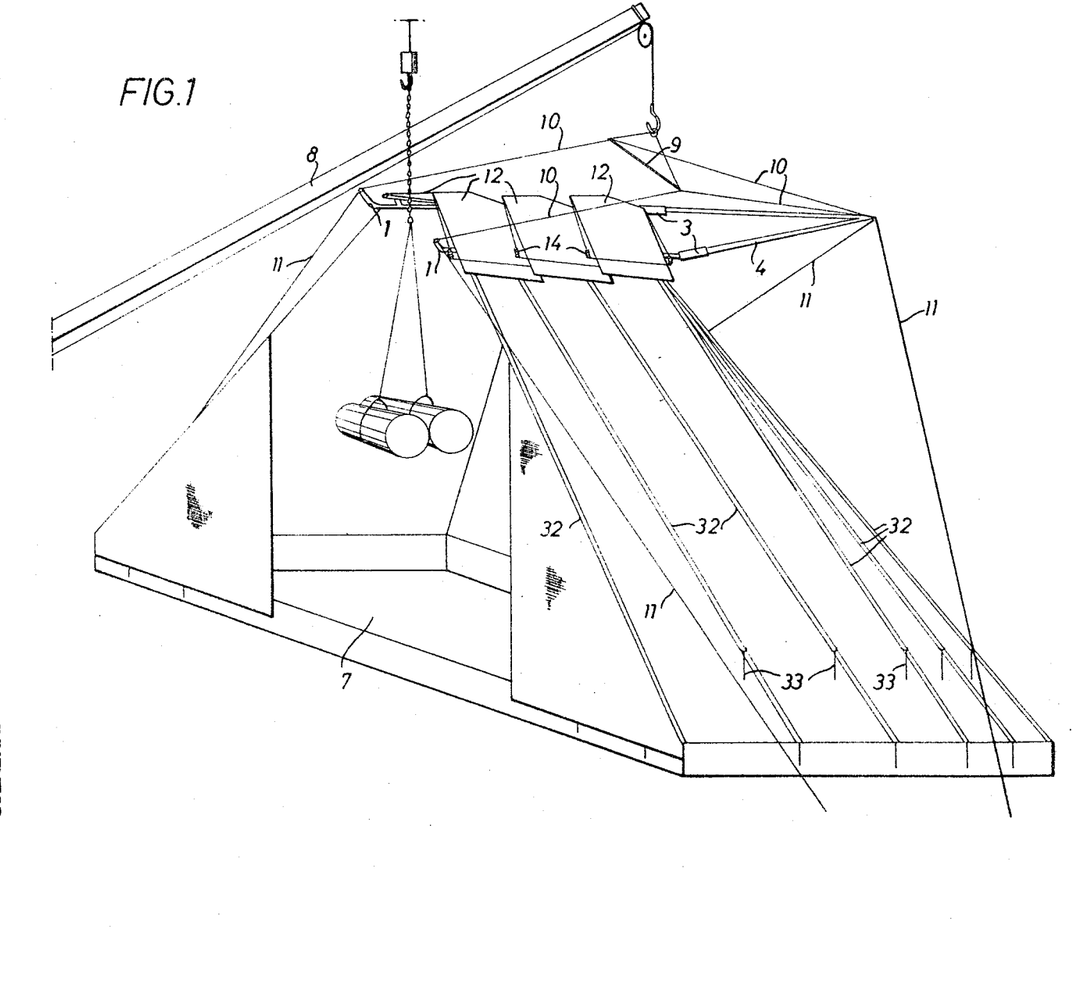
FIGURE 1 is a perspective view of a rain cover according to the invention supported above a hatchway.
Figure 2:
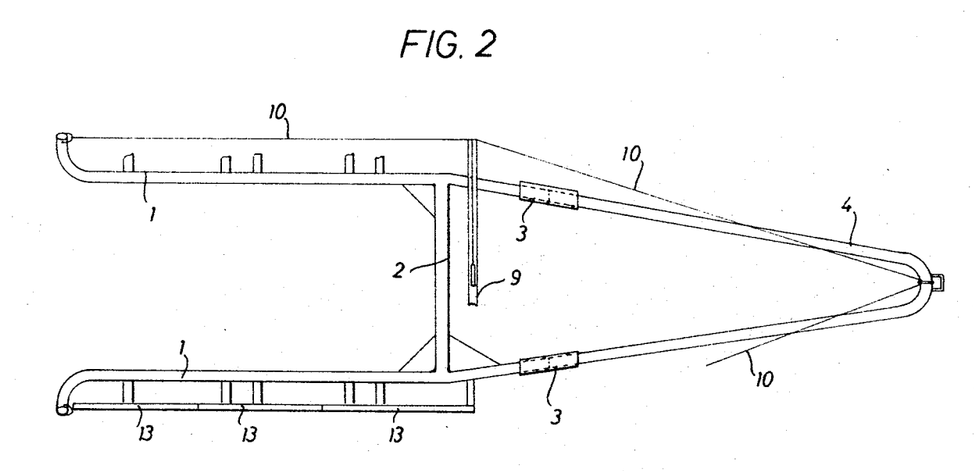
FIGURE 2 is a view from above of the frame of the rain cover.
Figure 3:
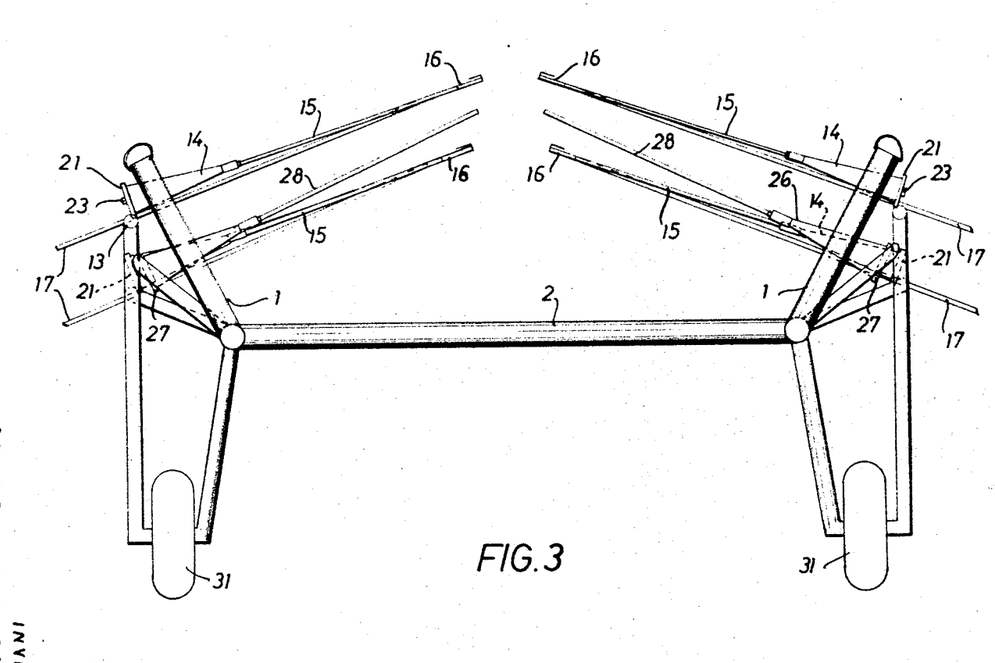
FIGURE 3 is an end view of the frame drawn to a larger scale.
Figure 4:
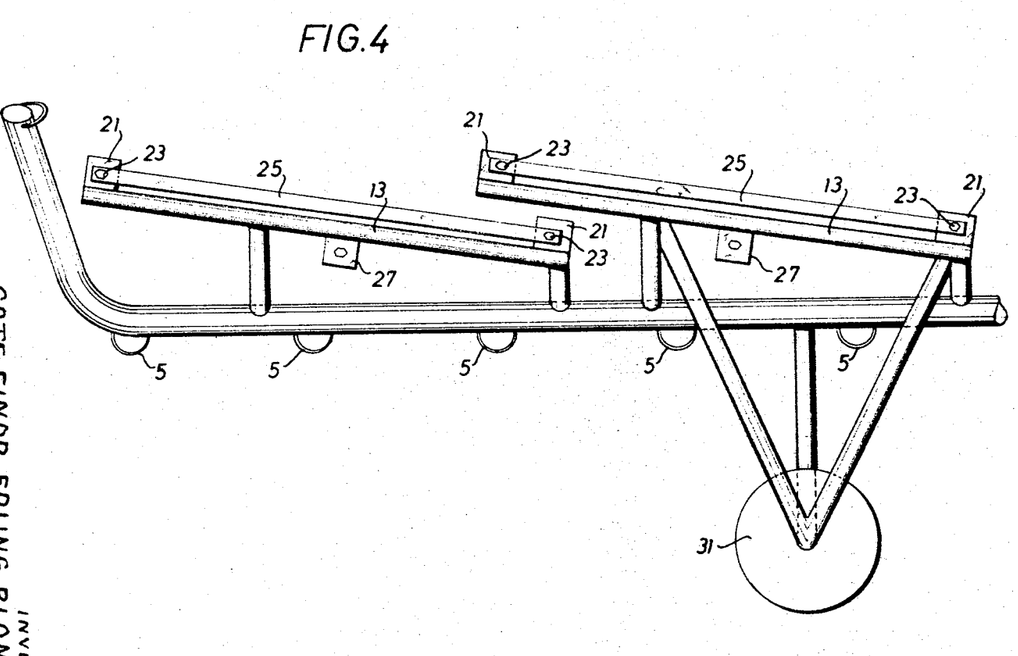
FIGURE 4 is a side view of a portion of the frame.

The frame shown in FIGURES 2–4 comprises a yoke-shaped portion the legs of which are indicated at 1 and the middle portion of which is indicated at 2. The frame further comprises an elongated, substantially yoke-shaped portion 4 which is connected to the yoke 1, 2 by means of connecting sleeves 3. The yoke legs 1 are provided at their lower side with shackles 5 for attaching the rain cover cloth or awning indicated at 6 in FIGURE 1. The frame may be supported for instance as illustrated in FIGURE 1 above a hatchway 7 by means of a load boom 8 and a hoisting yoke 9 and wires 10 extending from the hoisting yoke to the free ends of the yoke legs 1 and to the outer end of the elongated yoke 4. When the frame is supported in this manner, the elongated yoke 4 constitutes a counterbalance arm for the yoke 1, 2. Numeral 11 indicates stay wires extending from the free ends of yoke legs 1 and from the free end of the balance arm.

As illustrated in FIGURE 1, the load line is intended, upon loading, to be inserted in the space between the yoke legs 1. The space between the yoke legs is wide enough to permit the load to be conveniently moved also at right angles to the longitudinal direction of the yoke legs. This is made possible according to the invention, without exposing the whole area between the yoke legs, by the provision of a number of cloth pieces or flaps 12 which are carried by the yoke in a manner more closely described herebelow, said flaps covering substantially the whole space between the yoke legs but being individually displaceable under the influence of the load line.

Figure 5:
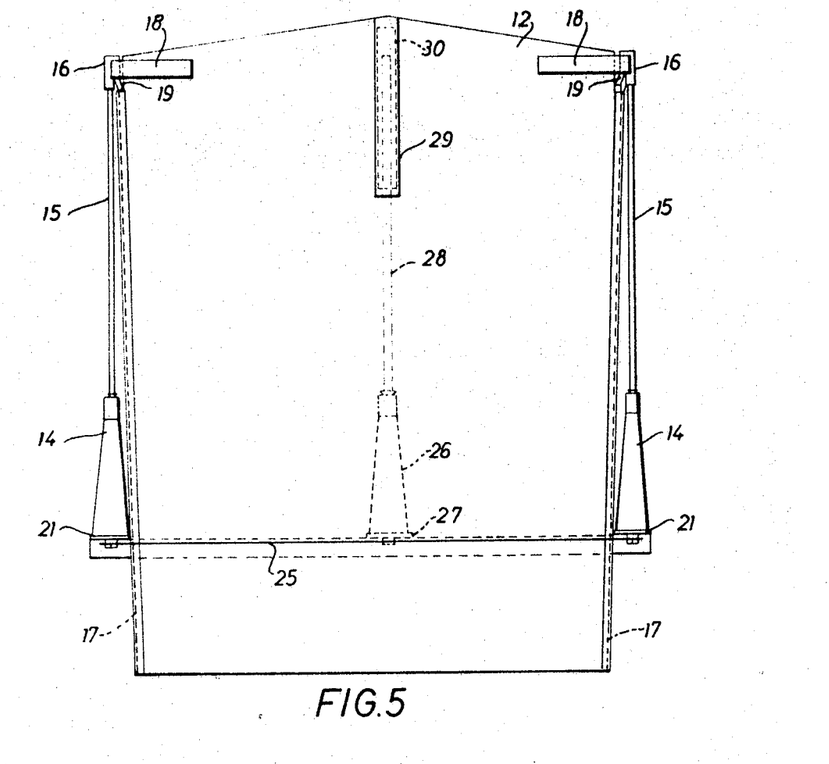
FIGURE 5 shows a flap forming part of the rain cover and also showing the means for supporting said flap.
Figure 6:
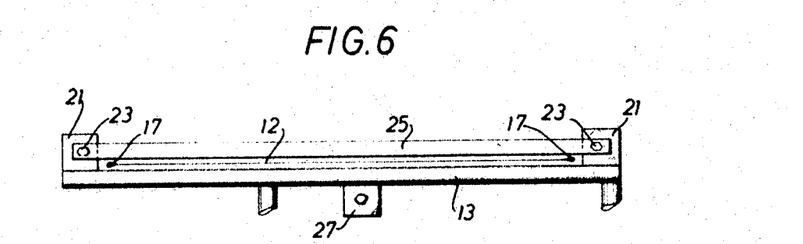
FIGURE 6 is a view from the lower side in FIGURE 5.
Figure 7:
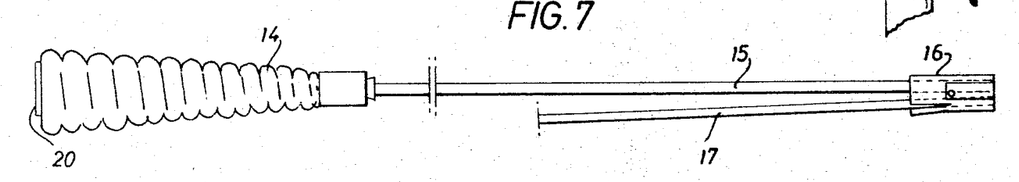
FIGURE 7 is a side view of one of the rods carrying the flap shown in FIGURES 5 and 6, FIGURES 8 and 9 show means for securing the rod to the frame.
Figure 8:
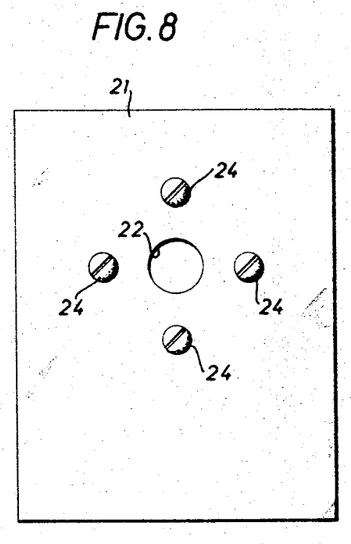
Figure 9:
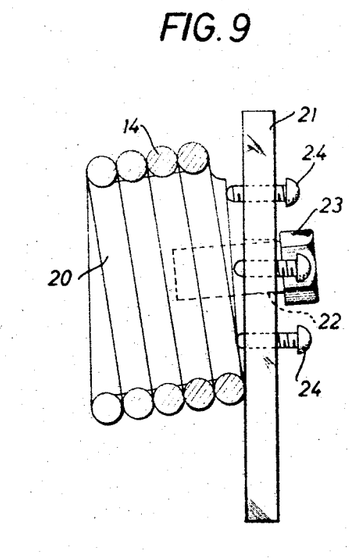
Figures 10, 11:
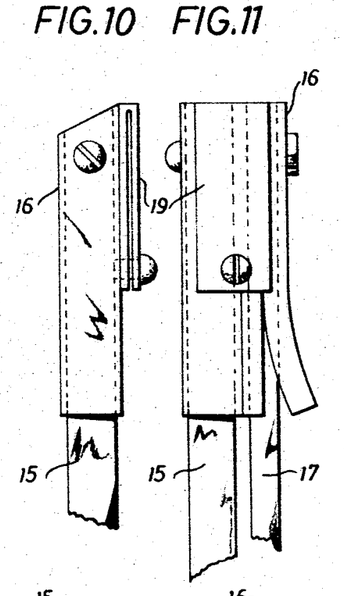
FIGURES 10 and 11 are two projections at right angles of an attachment device at the free end portion of the rod.

In the embodiment shown, three flaps 12 are provided on each yoke leg 1. Each yoke leg carries three mounting rails 13 for the means carrying the flaps 12, said mounting rails being inclined relative to the yoke leg. A rod 15 is mounted at each end of each of the rails 13 by the intermediary of a conical screw spring 14, said rod being directed at an angle upwards and extending in over the area between the yoke legs. Each of said rods is connected at its free end by means of an attachment member 16 with one end of an arm 17 of elastically bendable material extending substantially alongside the rod 15. The flap 12 is connected to the arms 17 at two opposite edges by means of folded-around edge portions in which the arms 17 are inserted. The flap is further connected, by means of ribbons 18 stitched to the corner portions thereof, to a yoke-shaped portion 19 of the attachment members 16 connecting the rods 15 with the arms 17.

Each of the rods is connected to the narrow end of its conical screw spring 14 which at the wider end engages a block 20 (see FIGURE 1) which is surrounded by the wider end portion of the spring and provided with a corresponding groove for receiving the turns of the spring, said block being connected to an attachment plate 21 by means of a bolt 23 inserted through a hole 22 in the attachment plate and screwed into the block 20. The diameter of the hole 22 is so large that the bolt 23 is rockable therein for permitting the block 20 to be inclined with respect to the plate 21 by means of set screws 24 inserted through the plate and abutting the end surface of the block, so that the direction of the spring and thereby also the direction of the rod carried by the spring with respect to the attachment plate may be varied slightly. The attachment plates 21 are secured to the rails 13, and between those attachment plates 21 which are provided at the ends of each rail 13 there is connected a ribbon or rail 25 extending in parallel with the rail 13 and spaced therefrom. The arms 17 connected to the rods 15 and the flap 12 arranged therebetween are guided in the space between the rails 13 and 25 for guiding the movement of the arms and the flap upon bending of the rods 15 in either direction.

In the embodiment shown, a further rod 28 is secured to each rail 13 between the rods 15 by means of a conical screw spring 26 and an attachment plate 27, said rod 28 serving to support the flap between the sides thereof which are connected to the rods 15. In the embodiment shown, each flap 12 is shaped in such a manner that a portion of the flap between the rods 15 extends slightly outside an imaginary straight line drawn through the free ends of the rods 15. For stiffening this portion of the flap a pocket 29 is stitched to one side thereof and a stiffening element 30 is inserted therein.

During a loading or unloading operation, a load line may be inserted anywhere in the space between the yoke legs 1, whereupon the rods 15 yield under the influence of the load line for permitting the load line to pass. As soon as the load line has passed a flap the latter is returned to the initial position illustrated in FIGURE 1. Since the rods are yieldable in all directions the load line, when inserted between the yoke legs, may also be moved in a direction transversely of the longitudinal direction of the yoke legs.

The invention has been described hereinbefore in connection with a rain cover suspended over a hatchway to a ship hold, but it should be understood that a rain cover according to the invention may be used also when loading or unloading for instance railway cars. In such an application it is not necessary that the frame be supported by a hoisting device. Instead, the yoke 1, 2 may constitute a portion of a frame which may be placed on the ground or supported in any other suitable manner. In order to make possible convenient transportation of the rain cover when dismantled, the frame in the embodiment shown in the drawings is provided with wheels 31.

Figure 12:
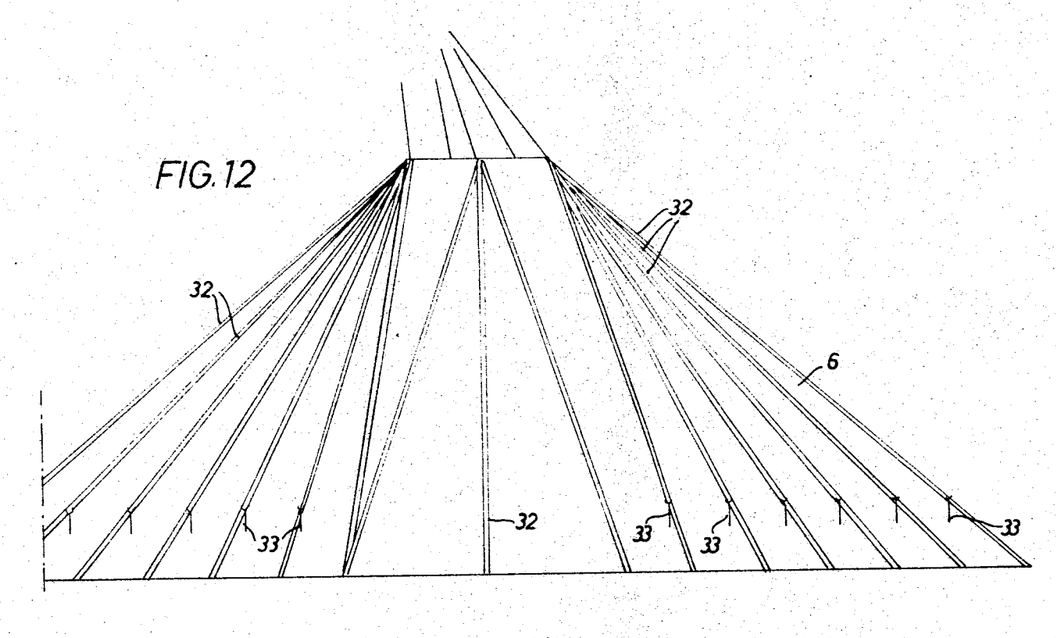
FIGURES 12 and 13 show two different positions of the rain cover in position of use.
Figure 13:
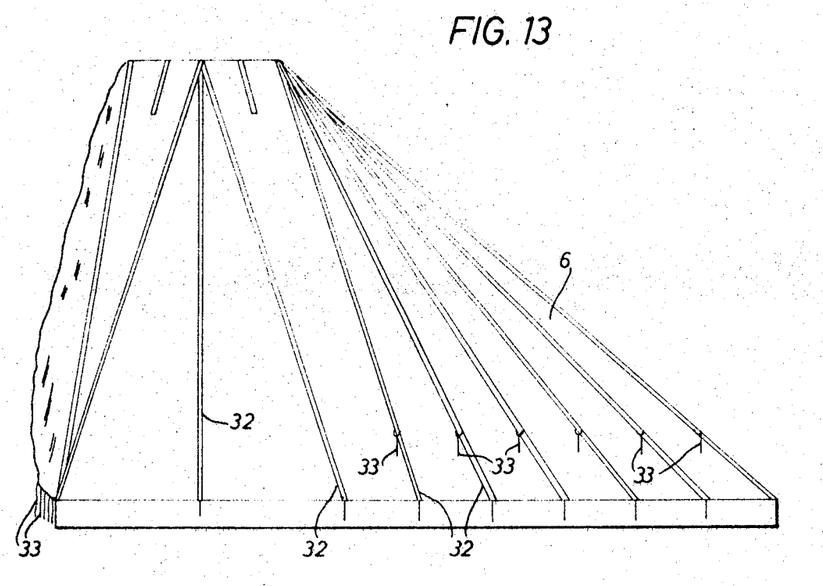

The awning 6 which may be of canvas or other suitable material is provided with a number of reinforcing ribbons 32. Straps for securing the awning to for instance a coaming are secured to said ribbons in order to relieve the cloth from the stretching strain. Such straps may be provided at the lower edge of the awning, i.e. at the lower end of the ribbons 32, and also higher up on the cloth, likewise at the ribbons 32. This makes it possible to place the rain cover above a hatchway not only in the manner illustrated in FIGURE 12 but also as illustrated in FIGURE 13 where one side portion of the cloth has been drawn together, whereat those straps indicated at 33 in FIGURES 1 and 13 which are disposed a distance above the lower edge of the awning at the ribbons 32 are employed for securing the awning to the coaming. As will appear from FIGURE 13, this manner of mounting the rain cover makes it possible to place the yoke 1, 2 serving for the insertion of the load line nearer to one edge of the hatchway as compared to the central position in FIGURE 12.

Figure 14:
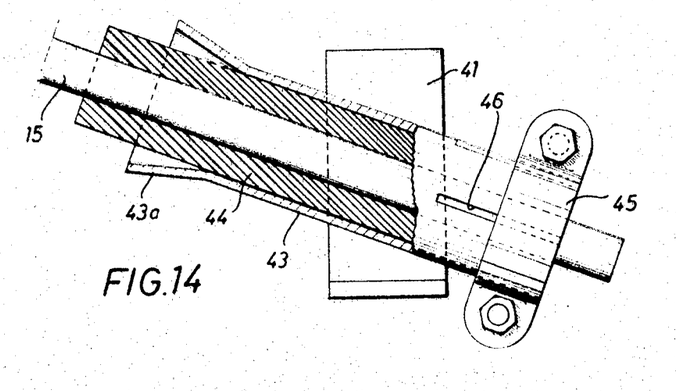
FIGURE 14 is a partly broken side view of a mounting device for the flap-carrying rods according to another embodiment of the invention.
Figure 15:
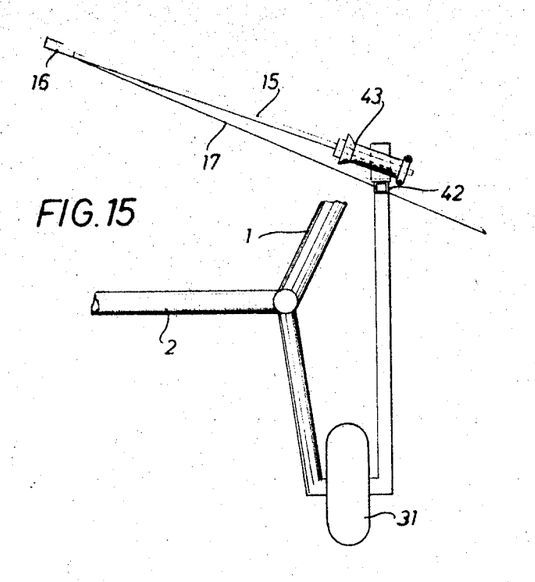
FIGURE 15 is a broken end view showing a rod mounted to the yoke by means of a device according to FIGURE 14.

In the embodiment described above, the rods 15 are yieldingly secured to the yoke by means of conical screw springs. Another embodiment of the attachment means for the rods is illustrated in FIGURES 14 and 15. In FIGURES 14 and 15 numeral 41 indicates an attachment plate for mounting on a rail 42 secured to the yoke and corresponding to the rail 13 in the embodiment described hereabove. At one side of the attachment plate 41 there is secured a sleeve 43 which receives a sleeve 44 of rubber or other elastic material in which the rod 15 is inserted. The sleeve 43 is provided, at the end facing the free end of the rod 15, with an enlarged portion 43a for permitting the rod and rubber sleeve 44 to bend. At the opposite end the sleeve 43 is provided with a number of axial slots 46 open towards the edge of the sleeve, and this slotted end portion of the sleeve is clamped around the rubber sleeve 44 by means of a clamp 45 for securing the rod 15 and the rubber sleeve 44 in the sleeve 43.

The invention is not limited to the embodiment described hereinbefore and shown in the drawings as an example only, said embodiment being susceptible of modifications with respect to its details without departing from the scope of the appended claims.

What I claim is:

1. A rain cover for protecting a loading area, for instance a hatchway, and comprising an awning supported by a frame and further provided at the upper side with an elongated opening which is open at one end for the insertion therein of a load line, characterised in that the frame comprises an elongated yoke which is substantially horizontal in the position of use of the rain cover, the legs of said yoke defining said opening and being so widely spaced from one another as to allow a load line inserted between said legs to be moved freely in all directions, said yoke legs carrying a number of rods which have one end yieldingly connected to said yoke legs and which extend towards the opposite yoke leg at an upwardly directed angle to adjacent a vertical middle plane between said yoke legs, said rods carrying a number of flaps which are distributed along said elongated opening on each side of said middle plane and which are displaceable under the influence of the load line by yielding of said rods.

2. A rain cover for protecting a loading area comprising a frame, an awning supported by said frame and provided at the upper side thereof with an elongated opening which is open at one end for the insertion therein of a load line, said frame having an elongated yoke which is substantially horizontal in the position of use of the rain cover, said yoke having legs defining said opening and being widely spaced from one another to allow a load line inserted between said legs to be moved freely in all directions, a plurality of rods each having one end yieldingly connected to said yoke legs and each extending towards its opposite leg on an upwardly directed angle to adjacent to a vertical middle plane between said yoke legs, a plurality of flaps carried by said rods which are distributed along said elongated opening on each side of said middle plane and which flaps are displaceable under the influence of the load line by the yielding of said rods, each of said flaps being of a substantially rectangular shape and being carried by opposite edges thereof by a pair of said rods and each pair of rods being so positioned relative to the adjacent pair that adjacent flaps slightly overlap at said edges.

3. A rain cover as claimed in claim 2, characterised in that each of said rods is connected at its free end to an arm of elastically bendable material extending alongside said rod, the edge portion of the flap carried by said rod being connected to said arm.

4. A rain cover as claimed in claim 2, characterised in that between the two rods carrying one flap there is provided a third rod which is also yieldingly connected to the yoke and which supports the flap between the edges thereof supported by said first-mentioned rods.

5. A rain cover as claimed in claim 2, characterised in that each flap comprises a stiffened portion projecting beyond a straight line connecting the free ends of the two rods carrying said flap.

References Cited

UNITED STATES PATENTS

| | | | |
|---|---|---|---|
| 2,843,273 | 7/1958 | Sanden | 135—6 XR |
| 3,348,705 | 10/1967 | Yanow | 135—6 XR |

FOREIGN PATENTS 802,235  10/1958  Great Britain.

KENNETH DOWNEY, Primary Examiner

U.S. Cl. X.R.

214—15